United States Patent [19]
Fujii et al.

[11] 3,880,900
[45] Apr. 29, 1975

[54] PROCESS FOR PREPARING METAL COMPLEX OF ALKYLENE BISDITHIOCARBAMATE

[75] Inventors: Chiyuki Fujii, Yamato; Yukio Hasegawa, Machida, Tokyo, both of Japan

[73] Assignee: Denki Kogaku Kogyo K.K., Tokyo, Japan

[22] Filed: Dec. 14, 1972

[21] Appl. No.: 315,010

Related U.S. Application Data
[63] Continuation-in-part of Ser. No. 167,646, July 30, 1971, abandoned.

[30] Foreign Application Priority Data
July 28, 1971  Germany............................ 2137779

[52] U.S. Cl....... 260/429 K; 260/429 R; 260/429.9; 260/438.1; 260/435; 260/439 R; 260/446; 260/447; 260/513.5; 260/286
[51] Int. Cl. ........ C07f 15/00; C07f 9/00; C07f 3/00
[58] Field of Search............. 260/429 R, 429.9, 438.1, 260/439, 435

[56] References Cited
UNITED STATES PATENTS

| | | | |
|---|---|---|---|
| 3,082,229 | 3/1963 | Nash | 260/429 K |
| 3,085,042 | 4/1963 | Luginbuhl | 260/429 R |
| 3,178,336 | 4/1965 | Mugno | 260/429 K |
| 3,210,394 | 10/1965 | Nemec et al. | 260/429 K |
| 3,294,829 | 12/1966 | Lehmann et al. | 260/429 K |
| 3,326,951 | 6/1967 | Lehmann et al. | 260/429 K |
| 3,379,610 | 4/1968 | Lyon et al. | 260/429 K |
| 3,499,018 | 3/1970 | Stevenson | 260/429 K |
| 3,536,742 | 10/1970 | Novcroske | 260/429 K |

FOREIGN PATENTS OR APPLICATIONS
1,421,627   11/1965   France

*Primary Examiner*—Arthur P. Demers
*Attorney, Agent, or Firm*—Oblon, Fisher, Spivak, McClelland & Maier

[57] ABSTRACT

Metal substituted salts of an alkylene bis-dithiocarbamate have been prepared by reacting in a solid phase reaction, in the presence of a solvent, a difficultly water-soluble metal salt of an alkylene bisdithiocarbamate, having the general formula:

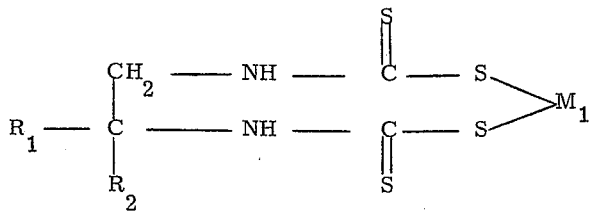

wherein $R_1$ is selected from the group consisting of hydrogen, methyl and ethyl and $R_2$ is selected from the group consisting of hydrogen, methyl, ethyl and propyl, such that when $R_1$ is hydrogen, $R_2$ represents methyl radical, ethyl radical or propyl; when $R_1$ is methyl, $R_2$ represents methyl, ethyl or propyl; when $R_1$ is ethyl radical, $R_2$ represents ethyl or propyl; and wherein $M_1$ is selected from the group consisting of manganese, iron, cobalt, nickel, zinc, lead, antimony, bismuth, or an alkaline earth metal, with a soluble metal salt having a metal ion $M_2$, which is different from said $M_1$, and which is selected from the group consisting of manganese zinc, iron, cobalt, lead, nickel, copper, antimony, and bismuth, so that at least a portion of said $M_1$ is substituted with a different metal of the $M_2$ group.

4 Claims, No Drawings

PROCESS FOR PREPARING METAL COMPLEX OF ALKYLENE BISDITHIOCARBAMATE

CROSS REFERENCE TO RELATED APPLICATION

This application is a Continuation-In-Part of application Ser. No. 167,646, Filed July 30, 1971, now abandoned, for "PROCESS FOR PREPARING METAL COMPLEX OF ALKYLENE BIS-DITHIOCARBAMATE"

BACKGROUND OF THE INVENTION

1. Field of the Invention:

This invention relates to a solid phase reaction process for preparing metal substituted salts of alkylene bis-dithiocarbamate.

2. Description of the Prior Art:

It is now well known that metal salts of ethylene-bis-dithiocarbamate, in general, demonstrate high levels of bacteriocidal activity. It is also known that certain mixed metal ion salts of ethylene-bis-dithiocarbamate will sometimes demonstrate even higher degrees of activity, but, heretofore, it has been unpredictable as to when such higher degrees of activity would be obtained. Mixed metal salts have heretofore been prepared by reacting different metal ions with ethylene-bis-thiocarbamate, or by coordinate bonding of Cu, Zn or Fe with Mn-ethylene-bis-dithiocarbamate (U.S. Pat. No. 3,379,610), but such reactions do not always result in improvements in bacteriocidal effects.

It has now been quite unexpectedly discovered that the method of producing the mixed metal ion salts has an intrinsic effect on the degree of bacteriocidal effect and from this it has been speculated that different reactions result in different types of mixed metal salt.

SUMMARY OF THE INVENTION

Accordingly, it is one object of this invention to provide a process for producing mixed metal salts of alkylene bis-dithiocarbamate having very high levels of bacteriocidal activity.

This and other objects have now herein been attained by the solid phase reaction, in the presence of a solvent, of (1) a difficultly watersoluble metal salt of an alkylene bis-dithiocarbamate having the general formula:

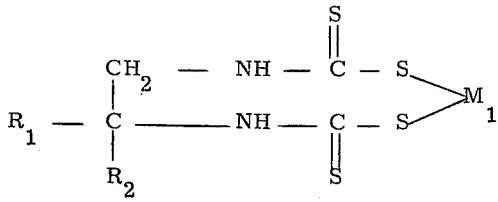

wherein $R_1$ may be hydrogen, methyl or ethyl and $R_2$ may be hydrogen, methyl, ethyl or propyl, such that when $R_1$ is hydrogen, $R_2$ is methyl, ethyl or propyl; when $R_1$ is methyl, $R_2$ is methyl, ethyl or propyl and when $R_1$ is ethyl, $R_2$ is ethyl or propyl and wherein $M_1$ is Fe, Mn, Co, Ni, Zn, Pb, Sb, Bi, or an alkali earth metal, with (2) a soluble salt having a metal ion $M_2$, which is different from said $M_1$, and which is selected from the group of Mn, Zn, Fe, Co, Pb, Ni, Cu, Sb, and Bi, so as to substitute a portion of said $M_1$ by $M_2$.

DETAILED DESCRIPTION OF THE PREFERRED EMBODIMENTS

Certain metal salts of the higher alkylene bis-dithiocarbamates are considered to be "unstable." It has now been found that by solid phase substitution of a portion of the unstable metal ions, with a more stable metal ion, that the end result is significantly improved bacteriocidal activity.

The process of this invention is different from the conventional process for preparing a metal double salt of alkylenebisdithiocarbamate in the condition of solution, and it is also different from the conventional process for preparing a complex by adding a metal salt solution to a slurry of manganese ethylenebisdithiocarbamate. In accordance with the invention, the metal $M_1$ is substituted in the slurry condition.

The difficultly water-soluble metal salt having the above formula is slurried with a suitable solvent. A solution containing the metal ion $M_2$ in amounts of 1 - 100 times of the theoretical amount necessary for the substitution, is added dropwise to the slurry while stirring.

The metal ion solution may be formed from a solvent soluble metal salt, such as a metal halide, metal nitrate, metal sulfate, metal acetate, or the like salt.

The reaction is effected at a temperature of 5 - 60°C. and a pH of 3 - 10.

Best substitution is obtained when $M_1$ is zinc or an alkali earth metal, and $M_2$ is zinc, iron, manganese, lead or nickel.

The substitution ratio of $M_1$ to $M_2$ is from 0.01 - 0.99 and preferably from 0.01 - 0.30. Especially good results are obtainable, however, when the substitution ratio is from 0.01 - 0.20 by weight.

In the process of this invention, the substitution reaction effectively proceeds when the ionization tendency of $M_2$ is lower than that of $M_1$. Certain substitution can be provided even when the ionization tendency of $M_2$ is higher than that of $M_1$.

Water is the most suitable reaction solvent, although other solvents may be used such as the lower alcohols, e.g., methanol, ethanol, or other polar solvents, such as dimethylformamide, dimethylsulfoxide, acetonitrile, diethylacetoamide, pyridine or hexamethylenephosphoamide.

If desired, a stabilizer, such as hexamethylene-tetramine (Urotropin) may be added to the reactants.

One of the unique attributes of this invention is that it is now possible to easily prepare zinc, iron, manganese, lead or nickel substituted salts of higher alkylene bis-dithiocarbamate having 3 - 7 carbon atoms in the alkylene group. These types of salts, heretofore, have been very difficult to prepare.

Having now generally described the invention, a further understanding can be obtained by reference to certain specific Examples which are provided herein for purposes of illustration only and are not intended to be limiting in any manner unless otherwise specified.

EXAMPLE 1

30 parts by weight of water was added to 1 part by weight of zinc propylene bis-dithiocarbamate [$CH_3CH(NHCSS)CH_2(NHCSS)Zn$] to make a slurry, and then an aqueous solution containing one-fifth parts by weight of nickel chloride hexahydrate was added dropwise to said slurry and the mixture was reacted at room temperature for 3 hours, while stirring, in solid phase. The resulting slurry was filtered and washed with water and then dried in vacuum.

The yield of the substituted product to said zinc propylenebis-dithiocarbamate was 98 percent. As the result of analysis it was found that the product contained 40 percent of carbon bisulfide component, 25 percent of zinc component and 2 percent of nickel component.

EXAMPLE 2

30 parts by weight of water was added to 1 part by weight of zinc propylene bis-dithiocarbamate to make a slurry, and an aqueous solution containing one-tenth part by weight of cupric chloride dihydrate was added dropwise to said slurry and the mixture was reacted at room temperature for 3 hours, while stirring, in solid phase. The resulting slurry was filtered and washed with water and then dried in vacuum.

The yield of substituted product to said zinc propylene-bisdithiocarbamate was 98 percent. As the result of analysis, it was found that the product contained 39 percent of carbon bisulfide component, 23 percent of zinc component, and 3 percent of copper component.

EXAMPLE 3

30 parts by weight of water was added to 1 part by weight of lead propylene bis-dithiocarbamate [$CH_3CH$ ($NHCSS$) $CH_2$ ($NHCSS$) $Pb$] to make a slurry and an aqueous solution containing one-fourth part by weight of cupric chloride dihydrate was added dropwise and then the mixture was reacted at 35°C. for 3 hours, while stirring, in solid phase. The resulting slurry was filtered and washed with water and then dried in vacuum.

The yield of substituted product to lead propylene bis-dithiocarbamate was 98 percent. As the result of analysis, it was found that the product contained 30 percent of carbon bisulfide component, 37 percent of lead component and 5 percent of copper component.

EXAMPLE 4

30 parts by weight of water was added to 1 part by weight of zinc isobutylene bis-dithiocarbamate [($CH_3$)$_2$ $C$ ($NHCSS$) $CH_2$ ($NHCSS$)$Zn$] to make a slurry and an aqueous solution containing one-fifteenth part by weight of cupric chloride dihydrate was added dropwise to it and the mixture was reacted at room temperature for 3 hours, while stirring, in solid phase. The resulting slurry was filtered and washed with water and then dried in vacuum.

The yield of substituted product to zinc isobutylene bisdithiocarbamate was 97 percent. As the result of analysis, it was found that the product contained 37 percent of carbon bisulfide component, 21 percent of zinc component and 3 percent of copper component.

EXAMPLE 5

30 parts by weight of water was added to 1 part by weight of nickel isobutylene bis-dithiocarbamate [($CH_3$)$_2$ $C$ ($NHCSS$) $CH_2$ ($NHCSS$)$Ni$] to make a slurry and an aqueous solution containing one-twentieth part by weight of lead acetate trihydrate was added dropwise and then the mixture was reacted at room temperature for 3 hours, while stirring, in solid phase. The resulting slurry was filtered and washed with water and then dried in vacuum.

The yield of substituted product to nickel isobutylene bisdithiocarbamate was 96 percent. As the result of analysis, it was found that the product contained 41 percent of carbon bisulfide component, 14 percent of nickel component and 5 percent of lead component.

EXAMPLE 6

30 parts by weight of water was added to 1 part by weight of zinc n-butylene bis-dithiocarbamate [$C_2H_5$ $CH$ ($NHCSS$) $CH_2$ ($NHCSS$) $Zn$] to make a slurry and an ethanol solution containing one-tenth part by weight of cobalt acetate tetrahydrate was added dropwise to it, and the mixture was reacted at room temperature for 3 hours, while stirring, in solid phase. The resulting slurry was filtered and washed with water and then dried in vacuum.

The yield of substituted product to said zinc n-butylene bisdithiocarbamate was 96 percent. As the result of analysis, it was found that the product contained 43 percent of carbon bisulfide component, 22 percent of zinc component and 2 percent of cobalt component.

A solution of 0.1 part by weight of ferrous chloride in $H_2O$ was added dropwise to a slurry of 1 part by weight of zinc salt of 2-methylbutylenebisdithiocarbamate in 50 parts by weight of water, and the mixture was stirred at room temperature for 6 hours in a nitrogen gas atmosphere. The resulting slurry was filtered and washed with water and dried in vacuum.

The yield of the reaction product was 97 percent to the starting material zinc salt of 2-methylbutylene bisdithiocarbamate.

According to the elementary analysis, it was found 44 percent of $CS_2$, 16 percent of Zn and 2 percent of Fe.

EXAMPLE 7

30 parts by weight of water was added to 1 part by weight of zinc 2-methylpentene bis-dithiocarbamate [$CH_3C_3H_7C$ ($NHCSS$) $CH_2$ ($NHCSS$) $Zn$] to make a slurry and an aqueous solution containing one-tenth part by weight of ferrous sulfate heptahydrate was added dropwise to it and the mixture was reacted at room temperature for 3 hours, while stirring, in solid phase. The resulting slurry was filtered and washed with water and then dried in vacuum.

The yield of substituted product to zinc 2-methylpentene bisdithiocarbamate was 97 percent. As the result of analysis, it was found that the product contained 39 percent of carbon bisulfide component, 18 percent of zinc component, and 5 percent of iron component.

EXAMPLE 8

An aqueous solution containing one-fifth part by weight of nickel chloride hexahydrate was added dropwise to an aqueous solution of 1 part by weight of zinc 2-ethylbutylene bis-dithiocarbamate [($C_2H_5$)$_2$ $C$ ($NHCSS$) $CH_2$ ($NHCSS$) $Zn$] and the mixture was reacted at room temperature for 3 hours, while stirring, in solid phase. The resulting slurry was filtered and washed with water and dried in vacuum. As the result of analysis, it was found that the product contained 37 percent of carbon bisulfide component, 19 percent of zinc component, and 2 percent of nickel component.

EXAMPLE 9

50 parts by weight of water was added to 1 part by weight of magnesium propylene bis-dithiocarbamate

[CH₃CH (NHCSS) CH₂(NHCSS) Mg] to make a slurry and an aqueous solution containing 8 parts by weight of zinc chloride was added dropwise to it, and the mixture was reacted at room temperature for 5 hours, while stirring, in solid phase. The resulting slurry was filtered, washed and dried in vacuum.

The yield of substitured product to magnesium propylene bisdithiocarbamate was 96 percent. As the result of analysis, it was found that the product contained 46 percent of carbon bisulfide component, 1 percent of magnesium component, and 20 percent of zinc component.

EXAMPLE 10

50 parts by weight of water was added to 1 part by weight of zinc 2-methylbutylene bisdithiocarbamate to make a slurry and an aqueous solution containing one-tenth part by weight of ferrous chloride tetrahydrate was dropwise added to it and the mixture was reacted at room temperature for 6 hours, in nitrogen gas atmosphere, while stirring, in solid phase. The resulting slurry was filtered and washed with water and then dried in vacuum.

The yield of the substituted product to said zinc 2-methylbutylene bisdithiocarbamate was 97 percent. As the result of analysis, it was found that the product contained 44 percent of carbon bisulfide component, 16 percent of zinc component and 2 percent of ion component.

EXAMPLE 11

50 parts by weight of water was added to 1 part by weight of zinc isobutylene bisdithiocarbamate to make a slurry and an aqueous solution containing 2 parts by weight of manganese sulfate was dropwise added to it and the mixture was adjusted to pH 6.7 with acetic acid and was reacted at 45°C for 6 hours, in nitrogen gas atmosphere while stirring, in solid phase. The resulting slurry was filtered and washed with water and then dried in vacuum.

The yield of the substituted product to said zinc isobutylenebisdithiocarbamate was 94 percent. As the result of analysis, it was found that the product contained 46 percent of carbon bisulfide component, 15 percent of zinc component and 4 percent of manganese.

EXAMPLE 12

A solution of 2 parts by weight of manganese sulfate was added dropwise to a slurry of 1 part by weight of zinc salt of isobutylene bisdithiocarbamate in 50 parts by weight of water, and the pH of the mixture was adjusted to 6.7 by adding acetic acid and the mixture was stirred at 45°C for 6 hours in a nitrogen gas atmosphere. The resulting slurry was filtered and washed with water and dried in vacuum.

The yield of the reaction product was 94 percent to the starting material zinc salt of isobutylenebisdithiocarbamate. According to the elementary analysis, it was found 46 percent of $CS_2$, 15 percent of Zn and 2 percent of Mn.

The following are the results of a bacteriocidal comparative test using the metal substituted salts of alkylene bis-dithiocarbamates prepared in accordance with Example 1 of this invention, and the metal salts prepared by conventional processes.

EXPERIMENT 1

Test for inhibiting damage caused by Cochliobolus miyabeanus Test Method

A pot having 5 cm of diameter was filled with soil and 10 pieces of rice seeds (paddy) (Norin 29 type rice) was sown. When 6–7 leaves of paddy rice were grown, 750 ppm of a suspension solution of each active ingredient was sprayed thereon so as to cover them. After air drying, the suspension solution containing Cochliobolus miyabeanus, which was cultured in a Popkins culture medium, was sprayed for innoculation, and then were maintained in a humidifier having 95 percent specific humidity, for 1 day and night. Then, they were moved to a hothouse. After 1 week, the observation of the conditions were made. The inhibiting value was calculated by the following formula:

$$\text{Inhibiting value} = 100 - \frac{\text{number of spots per one leaf in treated pot}}{\text{number of spots per one leaf in untreated pot}} \times 100$$

| Active ingredient | | Inhibiting value |
| --- | --- | --- |
| Reference | (1) | 90.9 |
| " | (2) | 75.7 |
| " | (3) | 89.5 |
| " | (4) | 80.1 |
| " | (5) | 91.3 |
| " | (6) | 91.6 |
| Invention | (7) | 99.0 |
| Invention | (8) | 95.0 |

*The active ingredients in said table are as follows:
(1) zinc propylene bis-dithiocarbamate
(2) nickel propylene bis-dithiocarbamate
(3) zinc nickel mixture salt of propylene bis-dithiocarbamate (prepared in liquid phase reaction)
(4) zinc nickel mixture salt of propylene bis-dithiocarbamate (physical mixture of Zn salt and Ni salt)
(5) manganese metal complex of ethylene bis-dithiocarbamate having zinc ions.
(6) zinc manganese complex metal salt of ethylene bis-dithiocarbamate (prepared in liquid phase reaction).
(1)–(6) are references.
(7) zinc, nickel substituted zinc salt of propylene bis-dithiocarbamate prepared in accordance with this invention (Exp. 1). (prepared in solid phase reaction)
(8) magnesium zinc substituted magnesium salt of propylene bis-dithiocarbamate prepared in Exp. 10.

EXPERIMENT 2

Each seedling of cucumber (30 days after seeding)-(Sagamihanjiro) in a pot was treated by spraying the active ingredient solution from a chromatography spray bottle and drying and then spraying a suspension containing 10 – 15 of spores of Bacterial will per a sweep of microscope (X 150) and leaving at 20°C for 24 hours. After 5 days, the condition was observed. The results are shown by 5 ranks method wherein the numeral 0 designates the degree of disease after 5 days and the numeral 5 designates the condition of no spores spraying seedling.

| | | Concentration | |
| --- | --- | --- | --- |
| Reference Compound | | 100 p.p.m. | 20 p.p.m. |
| " | (15) | 2 | 4 |
| " | (16) | 0 | 4 |
| " | (17) | 1 | 4 |
| " | (18) | 2 | 5 |
| " | (3) | 1 | 4 |
| " | (5) | 0 | 3 |
| Compound of this invention | (9) | 0 | 2 |
| " | (10) | 0 | 1 |
| " | (11) | 0 | 1 |
| " | (12) | 0 | 1 |

-Continued

|   | | Concentration | |
|---|---|---|---|
| " | (13) | 0 | 0 |
| " | (14) | 0 | 1 |

(15) zinc isobutylenebisdithiocarbamate
(16) zinc n-butylenebisdithiocarbamate
(17) manganese isobutylenebisdithiocarbamate
(18) zinc 1,3-propylenebisdithiocarbamate
(9) zinc isobutylenebisdithiocarbamate partially substituted with copper (prepared by the solid reaction).
(10) zinc isobutylenebisdithiocarbamate partially substituted with nickel. (prepared by the solid reaction).
(11) manganese isobutylenebisdithiocarbamate partially substituted with nickel. (prepared by the solid reaction).
(12) zinc isobutylenebisdithiocarbamate partially substituted with iron. (prepared by the solid reaction).
(13) zinc 1,2-propylenebisdithiocarbamate partially substituted with iron. (prepared by the solid reaction).
(14) zinc propylenebisdithiocarbamate partially substituted with manganese (prepared by the solid reaction).

EXPERIMENT 3

The field tests of cucumber:
The field of cucumber was divided to 6 section and 0.90 g/liter of each suspension containing the following active ingredient was sprayed each 4 days. After 1 month, the disease of Mehltan was observed by counting the number of spots of 20 leaves.

|   | Number of spot |
|---|---|
| manganese substituted zinc salt of propylene bisdithiocarbamate (substitution rate 5%) | 4 |
| manganese substituted zinc salt of isobutylene dithiocarbamate (substitution rate 3%) | 6 |
| ethylene bisdithiocarbamate Mn-Zn complex | 8 |

As it is clear from these results, the metal substituted salt of alkylene bis-dithiocarbamate prepared in accordance with this invention has 10 – 25 percent higher inhibiting activity than those compounds prepared by conventional processes. Moreover, a quite high yield of the compound can be obtained and stable metal complexes can be easily prepared by the process of this invention.

Having now fully described the invention, it will be apparent to one of ordinary skill in the art that many changes and modifications can be made thereto without departing from the spirit or scope of the invention.

What is claimed as new and desired to be secured by Letters Patent of the United States is:

1. A process for preparing a metal salt of an alkylene bis-dithiocarbamate, which comprises;
reacting in a solid phase reaction, in the presence of a solvent, a difficultly water-soluble metal salt of an alkylene bis-dithiocarbamate having the formula:

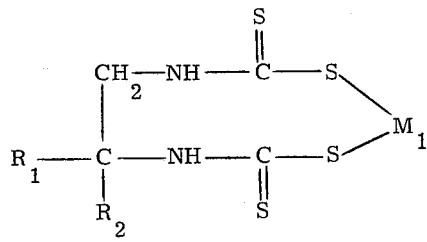

wherein $R_1$ is selected from the group consisting of hydrogen, methyl and ethyl and $R_2$ is selected from the group consisting of methyl, ethyl and propyl, such that when $R_1$ is hydrogen, $R_2$ represents methyl, ethyl or propyl; when $R_1$ is methyl, $R_2$ represents methyl, ethyl or propyl; when $R_1$ is ethyl, $R_2$ represents ethyl or propyl; and wherein $M_1$ is selected from the group consisting of manganese, iron, cobalt, nickel, zinc, lead, and an alkaline earth metal, with a soluble, divalent metal salt having a metal ion $M_2$, which is different from said $M_1$ and which is selected from the group consisting of manganese, zinc, iron, cobalt, lead, nickel, and copper, so that at least a portion of said $M_1$ is substituted with a different metal of the $M_2$ group.

2. The process of claim 1, wherein $M_1$ is selected from the group consisting of zinc and an alkaline earth metal, and $M_2$ is selected from the group consisting of zinc, iron, manganese, lead and nickel.

3. The process of claim 1, wherein the substitution ratio of $M_1$ to $M_2$ is from 0.01 – 0.99.

4. A metal salt of an alkylene bis-dithiocarbamate prepared by a process, which comprises:
reacting in a solid phase reaction, in the presence of a solvent, a difficultly water-soluble metal salt of an alkylene bis-dithiocarbamate having the formula:

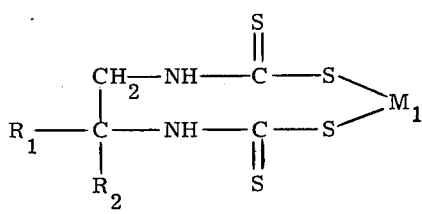

wherein $R_1$ is selected from the group consisting of hydrogen, methyl and ethyl and $R_2$ is selected from the group consisting of methyl, ethyl and propyl, such that when $R_1$ is hydrogen, $R_2$ represents methyl, ethyl or propyl; when $R_1$ is methyl, $R_2$ represents methyl, ethyl or propyl; when $R_1$ is ethyl, $R_2$ represents ethyl or propyl; and wherein $M_1$ is selected from the group consisting of manganese, iron, cobalt, nickel, zinc, lead and an alkaline earth metal, with a soluble divalent metal salt having a metal ion $M_2$, which is different from said $M_1$ and which is selected from the group consisting of manganese, zinc, iron, cobalt, lead, nickel and copper, so that at least a portion of said $M_1$ is substituted with a different metal of the $M_2$ group.

* * * * *